United States Patent
Asada et al.

(10) Patent No.: US 7,196,868 B2
(45) Date of Patent: Mar. 27, 2007

(54) HYDRODYNAMIC BEARING AND DISK RECORDING/REPRODUCING APPARATUS HAVING A VENT INSIDE A FIXED SHAFT

(75) Inventors: Takafumi Asada, Hirakata (JP); Hiroaki Saito, Ozu (JP); Keigo Kusaka, Ozu (JP); Daisuke Itou, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 362 days.

(21) Appl. No.: 10/725,150

(22) Filed: Dec. 1, 2003

(65) Prior Publication Data

US 2004/0184188 A1 Sep. 23, 2004

(30) Foreign Application Priority Data

Dec. 2, 2002 (JP) .............................. 2002-349693

(51) Int. Cl.
G11B 17/08 (2006.01)
G11B 17/02 (2006.01)

(52) U.S. Cl. ............................. 360/98.07; 360/99.04; 360/99.08

(58) Field of Classification Search ................. 384/113
See application file for complete search history.

(56) References Cited

U.S. PATENT DOCUMENTS

| 5,433,529 | A | | 7/1995 | Hensel |
| 6,059,459 | A | * | 5/2000 | Ichiyama .................... 384/112 |
| 6,183,135 | B1 | * | 2/2001 | Kloeppel et al. ........... 384/112 |
| 6,271,612 | B1 | * | 8/2001 | Tanaka et al. ................ 310/90 |

* cited by examiner

*Primary Examiner*—A. J. Heinz
(74) *Attorney, Agent, or Firm*—Akin Gump Strauss Hauer & Feld, LLP

(57) ABSTRACT

Radial dynamic pressure grooves are provided in a first region 4A and a second region 4B on the side of a fixed shaft 2. A vent 2D is provided inside the top end 2A of the fixed shaft 2. The vent 2D connects spaces over and under a flange 3 to each other. The flange 3 in an annular shape is fixed at the top end 2A of the fixed shaft 2. Thrust dynamic pressure grooves 3A and 3B are provided on the surfaces of the flange 3. A circulation hole 3C is provided in the flange 3, and connects spaces over and under the flange 3 to each other. A sleeve 4 revolves around the fixed shaft 2. A thrust plate 6 in an annular shape is fixed at the top of the sleeve 4 and opposed to the flange 3. The first region 4A, the second region 4B, the thrust dynamic pressure grooves 3A and 3B, and the circulation hole 3C of the flange 3 are filled with a lubricant 7. At the revolution of the sleeve 4, the lubricant 7 is concentrated in each central part of the first region 4A, the second region 4B, and the thrust dynamic pressure grooves 3A and 3B and their vicinities, then raising the pressure. The sleeve 4 keeps its stable high-speed revolution, avoiding contact with the fixed shaft 2. The lubricant 7 circulates on surfaces of the flange 3 through the circulation hole 3C.

9 Claims, 8 Drawing Sheets

HYDRODYNAMIC BEARING AND DISK RECORDING/REPRODUCING APPARATUS HAVING A VENT INSIDE A FIXED SHAFT

BACKGROUND OF THE INVENTION

The present invention relates to hydrodynamic bearings and disk recording/reproducing apparatuses equipped with them.

Disk recording/reproducing apparatuses include magnetic disks and magnetically or optically perform reading and writing of data for the magnetic disks while revolving the magnetic disks. Further increases in capacity and speedups of data transfers are required of disk recording/reproducing apparatuses. Accordingly, it is desired that revolutions of the magnetic disks become still faster and are stabilized with still higher precision. Hydrodynamic bearings are suitable for such high-speed and high-precision rotary drive systems.

An example of conventional hydrodynamic bearings is disclosed in the U.S. Pat. No. 5,433,529. FIG. 8 is a cross-sectional view showing the hydrodynamic bearing. The bottom end of a fixed shaft 22 is fixed on a base 21, and the top end is fixed on a cover (not shown). A flange 23 in an annular shape allows the top end of the fixed shaft 22 to pass through its inside and is fixed at the top end of the fixed shaft 22. A vertical groove 23C is provided on a side of the flange 23 touching a side of the fixed shaft 22, connecting spaces over and under the flange 23 to each other. Thrust dynamic pressure grooves 23A and 23B are provided on surfaces of the flange 23. A sleeve 24 and a hub 25 are integrated and surround the fixed shaft 22, being able to revolve around the fixed shaft 22. The flange 23 is then placed in a hollow 24D provided on an inner surface of the sleeve 24. A thrust plate 26 in an annular shape allows the top end of the fixed shaft 22 to pass through its inside, and is fixed at the top of the sleeve 24 and opposed to the flange 23. In this hydrodynamic bearing, in particular, a gap is provided between the top end of the fixed shaft 22 and the thrust plate 26. Radial dynamic pressure grooves (not shown) are provided on one or both of a side of the fixed shaft 22 and an inner surface of the sleeve 24. Radial dynamic pressure grooves are usually provided on two separate regions, a first region 24A near the flange 23 and a second region 24B near the base 21. Thrust dynamic pressure grooves and radial dynamic pressure grooves are, for example, herringbone-shaped grooves. Gaps between the fixed shaft 22 and the sleeve 24, in particular, the radial dynamic pressure grooves and their vicinities 24A and 24B, and the thrust dynamic pressure grooves 23A and 23B and their vicinities, are filled with a lubricant 27. Magnetic disks (not shown) are fixed on outer surfaces of the hub 25, being concentric with the fixed shaft 22. Magnets 28 are installed on inner surfaces of the hub 25. On the other hand, stators 29 are installed on the base 21 and opposed to magnets 28.

The above-described hydrodynamic bearing operates as follows. Rotating magnetic fields occur when the stators 29 are energized. The hub 25 undergoes a torque from the rotating magnetic fields through the magnets 28. Thereby, the sleeve 24, the hub 25, the thrust plate 26, and the magnetic disks (not shown) revolve in a body around the fixed shaft 22. During the revolution, the lubricant 27 flows along the radial dynamic pressure grooves and is concentrated in each central part of the first region 24A and the second region 24B. As a result, pressure in the radial direction of the fixed shaft 22 is enhanced in those central parts. This pumping effect maintains stable spacing between the fixed shaft 22 and the sleeve 24, and thereby the rotation axis of the magnetic disks does not substantially shift in the radial direction of the fixed shaft 22. Similarly, the lubricant 27 flows along the thrust dynamic pressure grooves 23A and 23B and is concentrated in each central part of regions where the thrust dynamic pressure grooves 23A and 23B are provided. As a result, pressure in the axial direction of the fixed shaft 22 is enhanced on surfaces of the flange 23. This pumping effect maintains stable spacing between the flange 23 and the hollow 24D of the sleeve 24 and stable spacing between the flange 23 and the thrust plate 26. Therefore, the axis of rotation of the magnetic disks does not substantially tilt from the axial direction of the fixed shaft 22. Here, the lubricant 27 is allowed to circulate on surfaces of the flange 23 through the vertical groove 23C of the flange 23. Accordingly, the lubricant 27 keeps covering the whole of the thrust dynamic pressure grooves 23A and 23B, even when shocks/vibrations act from the outside, for example, and therefore, the above-described pumping effects are not lost. Thus, the above-described hydrodynamic bearing maintains the high-speed revolution of the magnetic disks stable with high precision.

The lubricant 27 covers the whole of the radial dynamic pressure grooves and the whole of the thrust dynamic pressure grooves, for example, just after the lubricant 27 is poured into the above-described hydrodynamic bearing, and so on. Under such conditions, the above-described pumping effects are fully exerted. However, an abundance of air bubbles intrudes into the lubricant 27, for example, after a time lapse of use, and accumulates in and near the intermediate region 24C between the first region 24A and the second region 24B (see FIG. 8), for example. When those air bubbles swell with variations of outside air pressure or temperature rises of the lubricant 27, the lubricant 27 is pushed by the swelling pressure of the air bubbles and shifts in the axial direction of the fixed shaft 22. Thereby, the lubricant 27 tends to escape upward from the gap between the top end of the fixed shaft 22 and the thrust plate 26, and downward from the gap between the bottom end of the fixed shaft 22 and the sleeve 24 (see droplets 27A and 27B shown in FIG. 8). In the above-described hydrodynamic bearing, in particular, the vertical groove 23C is provided in the flange 23, and hence the lubricant 27 tends to rise through the vertical groove 23C and escape upward from the gap between the top end of the fixed shaft 22 and the thrust plate 26. Furthermore, a so-called lack of oil film, that is, a condition that the lubricant 27 fails to cover the whole of the radial dynamic pressure grooves and the thrust dynamic pressure grooves, occurs when the amount of leakage of the lubricant 27 is excessive. In that case, the above-described pumping effects become insufficient, and thus the risk of serious wear of the fixed shaft 22 and the sleeve 24 due to excessively hard contact between each other increases.

SUMMARY OF THE INVENTION

An object of the present invention is to provide a hydrodynamic bearing that easily discharges air bubbles intruding inside a lubricant and reliably maintains a lubricant-filled condition of the whole of radial dynamic pressure grooves and thrust dynamic pressure grooves, thereby ensuring high reliability.

A hydrodynamic bearing according to the present invention comprises:

(a) a cabinet including a base and a cover;

(b) a fixed shaft including a first end having a mounting part fixed on one of the base and the cover, and a second end at the opposite side of the fixed shaft;

(c) a flange in an annular shape, with the second end of the fixed shaft inserted into its inside, and fixed on the second end of the fixed shaft, thereby being substantially perpendicular to the axial direction of the fixed shaft;

(d) a sleeve, when the fixed shaft is inserted into its inside, allowed to revolve around the fixed shaft and placed where a hollow provided on an inner surface of the sleeve is in the vicinity of a surface of the flange;

(e) a thrust plate in an annular shape and fixed on one of opening ends of the sleeve, thereby being placed close to the flange when the second end of the fixed shaft is inserted inside the thrust plate; and (f) a lubricant with which the whole of radial dynamic pressure grooves provided at least one of a side of the fixed shaft and an inner surface of the sleeve, and the whole of thrust dynamic pressure grooves provided at least one of a surface of the flange, a surface of the hollow of the sleeve, and a surface of the thrust plate, are filled and covered. In this hydrodynamic bearing according to the present invention, in particular, (g) a circulation hole connecting spaces over and under the flange to each other is provided, and the lubricant circulates on surfaces of the flange through the circulation hole; and (h) a vent connecting spaces around the joint between the fixed shaft and the flange to each other is provided.

For example, a disk recording/reproducing apparatus is equipped with this hydrodynamic bearing according to the present invention. Here, the disk recording/reproducing apparatus comprises:

(a) the same cabinet as the above-described one;

(b) a hub concentrically integrated with the sleeve;

(c) a motor installed between the cabinet and the hub, including a magnet and a coil, and for exerting to the hub a torque for a revolution around the fixed shaft;

(d) a magnetic disk concentrically fixed on the hub; and (e) a head, when the magnetic disk revolves because of the torque, being placed close to a surface of the magnetic disk, recording a signal onto the magnetic disk, and reproducing a signal from the magnetic disk.

In the above-described hydrodynamic bearing according to the present invention, the lubricant flows along the radial dynamic pressure grooves and is concentrated in predetermined regions when the sleeve revolves around the fixed shaft. As a result, pressure in the radial direction of the fixed shaft rises in gaps between the fixed shaft and the sleeve. This pumping effect maintains stable spacing between the fixed shaft and the sleeve, and thus, the axis of rotation of the sleeve does not substantially shift in the radial direction of the fixed shaft. Similarly, the lubricant flows along the thrust dynamic pressure grooves and is concentrated in predetermined regions. As a result, pressure in the axial direction of the fixed shaft rises on surfaces of the flange. This pumping effect maintains stable spacing between the flange and the hollow of the sleeve and stable spacing between the flange and the thrust plate. Therefore, the axis of rotation of the sleeve does not substantially tilt from the axial direction of the fixed shaft. Thus, the above-described hydrodynamic bearing according to the present invention maintains high-speed revolutions of the sleeve stable with high precision.

In particular, a lubricant can circulate on surfaces of the flange through the circulation hole in the above-described hydrodynamic bearing according to the present invention. Accordingly, the lubricant keeps covering the whole of the thrust dynamic pressure grooves, even when shocks/vibrations act from the outside, for example, and therefore, the above-described pumping effect is not lost. In other words, the hydrodynamic bearing according to the present invention maintains its high stability against fluctuations such as shocks/vibrations from the outside.

In addition, a vent connects spaces around the joint between the fixed shaft and the flange to each other in the above-described hydrodynamic bearing according to the present invention. Accordingly, no excessive differences in pressure occur over and under the flange. In particular, when an abundance of air bubbles intrude into the lubricant, those air bubbles accumulate in, for example, spaces around the joint between the fixed shaft and the flange. When those air bubbles swell with variations of outside air pressure or temperature rises of the lubricant, air circulates between spaces over and under the flange through the above-described vent, and further circulates between the spaces and outside spaces. As a result, pressure fluctuations of the air bubbles are eased, and thus, the lubricant does not shift because of the pressure fluctuations. Therefore, no lubricant escapes from the gap between the fixed shaft and the sleeve. Furthermore, the lack of oil film does not occur since the lubricant keeps covering the whole of the radial dynamic pressure grooves and the thrust dynamic pressure grooves with stability. Accordingly, the above-described pumping effects are maintained with stability. Thus, spacing between the fixed shaft and the sleeve is maintained with stability, and therefore, the above-described hydrodynamic bearing according to the present invention has high reliability.

Preferably, a circulation hole is provided in the flange and a vent is provided inside the fixed shaft in the above-described hydrodynamic bearing according to the present invention. A vent may be alternatively provided as a vertical groove on at least one of a side of the fixed shaft and a side of the flange. In addition, a circulation hole may be provided as a vertical groove on at least one of a side of the fixed shaft and a side of the flange, and a vent may be provided inside the fixed shaft.

In the above-described hydrodynamic bearing according to the present invention, gaps among the first end of the fixed shaft, the flange, and the thrust plate are preferably set as follows. Let A be a distance in the radial direction of the fixed shaft between the fixed shaft and the thrust plate, B be a distance in the axial direction of the fixed shaft between an inner radius of the thrust plate and the flange, and C be a distance in the axial direction of the fixed shaft between the thrust plate and the flange over the thrust dynamic pressure grooves and their vicinity. Then, inequalities $A>B>C$ hold. In that case, the sealing force of lubricant is strong in the gaps between the thrust plate and the flange, especially over the thrust dynamic pressure grooves and their vicinity. Accordingly, the lubricant is maintained with stability over the thrust dynamic pressure grooves and their vicinity. Furthermore, the lubricant hardly shifts to the gap between the fixed shaft and the thrust plate since the gap is set to be particularly large. Therefore, the lubricant is prevented from escaping upward from the gap.

In the above-described hydrodynamic bearing according to the present invention, gaps among the fixed shaft, the flange, the sleeve, and the thrust plate are preferably set as follows. Let B be a distance in the axial direction of the fixed shaft between an inner radius of the thrust plate and the flange, F be a distance in the axial direction of the fixed shaft between an inner radius of the flange and the above-described hollow of the sleeve, and D be a distance in the radial direction of the fixed shaft between the flange and the above-described hollow of the sleeve. Then, inequalities $B>D$ and $F>D$ hold. In that case, the sealing force of lubricant in the gap between the perimeter of the flange and the hollow of the sleeve is stronger than the sealing forces on the inner radii of the thrust plate and their vicinity, and stronger than the sealing forces on the inner radii of the flange and their vicinity. Accordingly, the lubricant is maintained with stability over and under the flange, putting respective, predetermined distances from the side of the fixed shaft. In particular, the lubricant reliably covers the whole of the thrust dynamic pressure grooves over and under the flange.

In the above-described hydrodynamic bearing according to the present invention, radial dynamic pressure grooves may be provided in two separated regions, a first region near the flange and a second region near the mounting part of the fixed shaft. In that case, gaps between the fixed shaft and the sleeve in the second region and its adjacent regions are preferably set as follows. Let N be a distance in the radial direction of the fixed shaft between the fixed shaft and the sleeve in the second region, M be the distance in a region adjacent to a side of the second region near the flange, and P be the distance at the opening of the sleeve near the mounting part of the fixed shaft. Then, inequalities $N<M<P$ hold. Thereby, the sealing force of lubricant in the second region is stronger than the sealing forces in its adjacent regions. Accordingly, the lubricant is maintained with stability in the second region. In particular, the lubricant hardly shifts from the second region to the mounting part side of the fixed shaft. Therefore, the lubricant is prevented from escaping downward from the gap between the vicinity of the mounting part of the fixed shaft and the sleeve.

When radial dynamic pressure grooves are separated into the above-described first and second regions in the above-described hydrodynamic bearing according to the present invention, gaps between the fixed shaft and the sleeve are preferably set in the first region, the second region, and their intermediate region, as follows. Let J be a distance in the radial direction of the fixed shaft between the fixed shaft and the sleeve in the first region, K be the distance in a region adjacent to a side of the first region near the second region, L be the distance in an intermediate region between the first region and the second region, M be the distance in a region adjacent to a side of the second region near the first region, and N be the distance in the second region. Then, inequalities $J<K<L$ and $N<M<L$ hold. Thereby, the sealing forces of lubricant in the first and second regions are stronger than the sealing force in the intermediate region. Accordingly, the lubricant is maintained with stability in the first and second regions.

When radial dynamic pressure grooves are separated into the above-described first and second regions in the above-described hydrodynamic bearing according to the present invention, gaps between the fixed shaft and the sleeve are preferably set in adjacent regions of the second region as follows. Let L be a distance in the radial direction of the fixed shaft between the fixed shaft and the sleeve in the intermediate region between the first region and the second region, and P be the distance at the opening of the sleeve near the mounting part of the fixed shaft. Then, an inequality $L<P$ holds. Thereby, the sealing force of lubricant in the above-described intermediate region is stronger than the sealing force in the opening of the sleeve near the mounting part of the fixed shaft. Accordingly, the lubricant hardly shifts from the second region to the mounting part side of the fixed shaft. Therefore, the lubricant is prevented from escaping downward from the gap between the vicinity of the mounting part of the fixed shaft and the sleeve.

The above-described hydrodynamic bearing according to the present invention has high reliability as described above.

When a disk recording/reproducing apparatus is equipped with the hydrodynamic bearing, revolution of magnetic disks can further become faster and be further stabilized with higher precision in the disk recording/reproducing apparatus. As a result, increases in capacity and speedups of data transfers can be easily enhanced. In addition, the disk recording/reproducing apparatus can maintain high reliability for a long time.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

The following describes the best embodiments of the present invention, with referring to the figures.

EMBODIMENT 1

Figure 7:
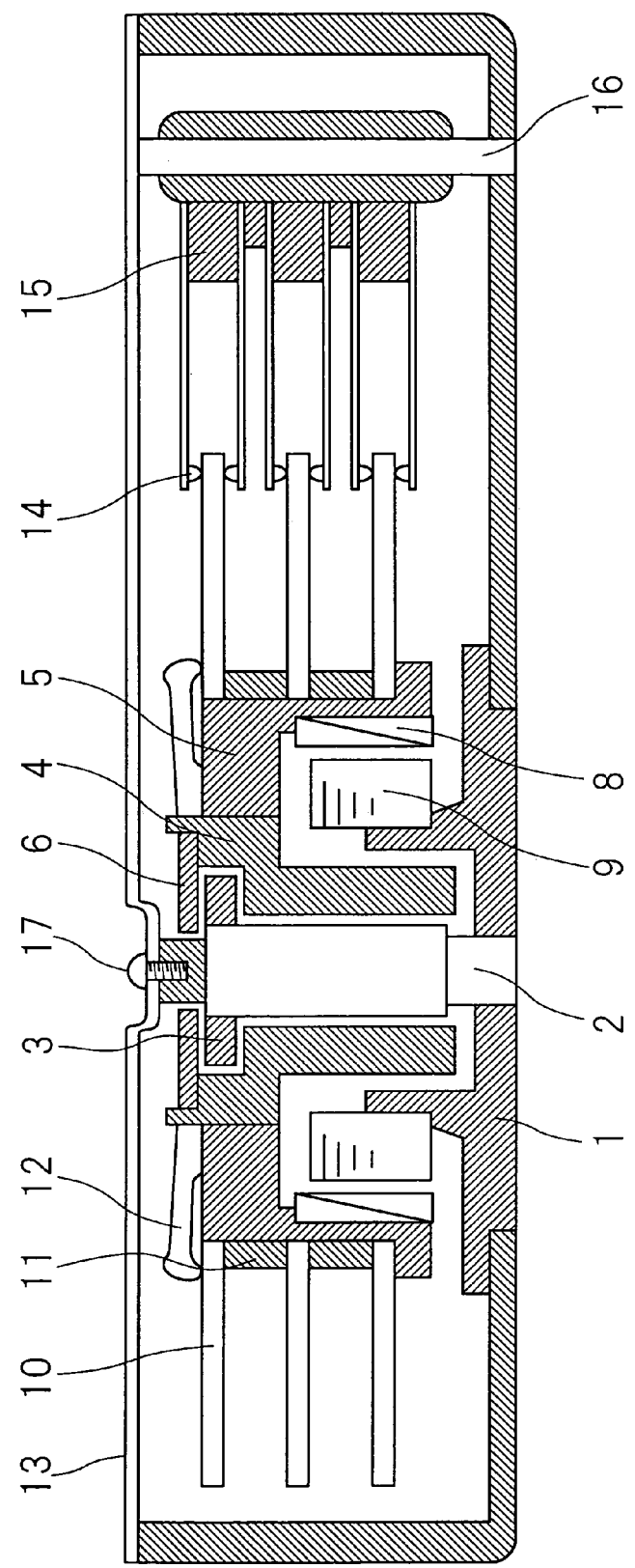
FIG. 7 is a cross-sectional view of a disk recording/reproducing apparatus according to the present invention.
Figure 8:
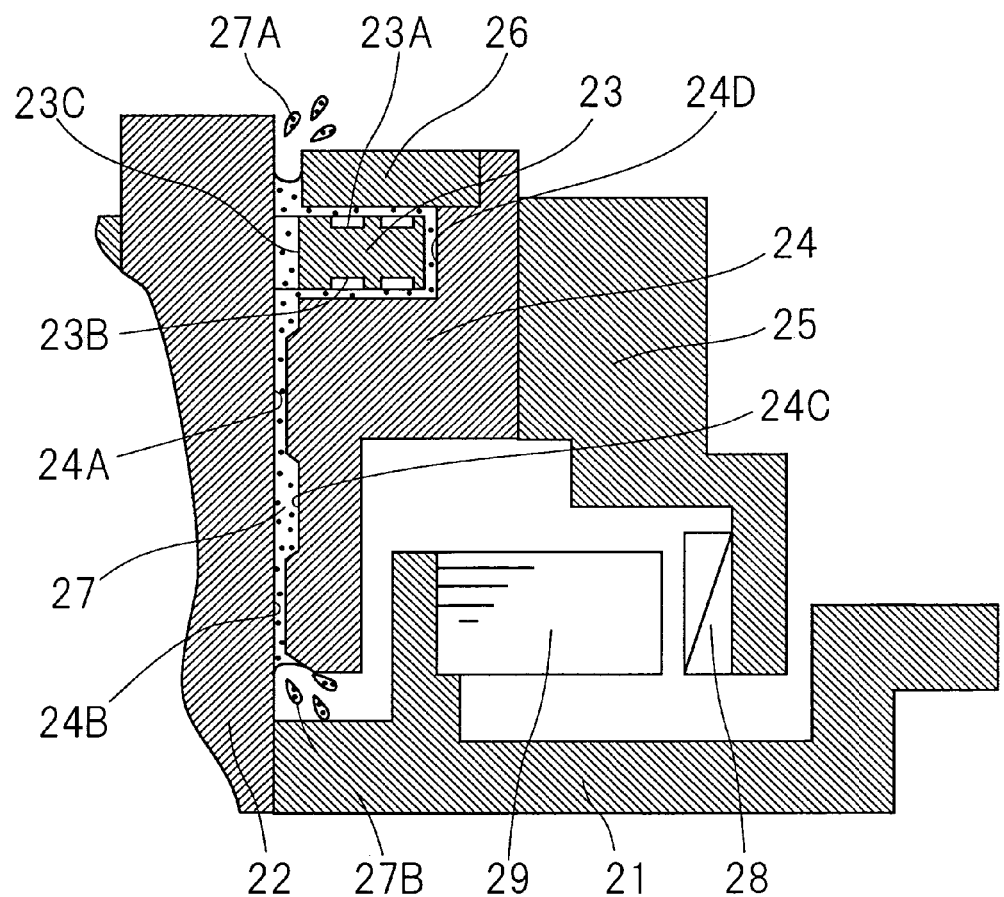
FIG. 8 is a cross-sectional view of a conventional hydrodynamic bearing.

FIG. 7 is a cross-sectional view of a disk recording/reproducing apparatus according to the present invention. This disk recording/reproducing apparatus comprises a base 1, a hydrodynamic bearing, a hub 5, magnetic disks 10, spacers 11, a clamper 12, a cover 13, heads 14, swing arms 15, and a support 16. The hydrodynamic bearing comprises a fixed shaft 2, a flange 3, a sleeve 4, and a thrust plate 6. The base 1 and the cover 13 are fit to each other, thereby forming a box-shaped cabinet. A bottom end of the fixed shaft 2 is a part for mounting on the base 1 and is fixed on the base 1. A top end of the fixed shaft 2 is fixed to the cover 13 with a screw 17. The top end of the fixed shaft 2 may be fixed to the cover 13 with a nut instead. Thus, the fixed shaft 2 is firmly fixed in the cabinet. A flange 3 in an annular shape allows the top end of the fixed shaft 2 to pass through its inside, and is fixed on the fixed shaft 2. The sleeve 4 and the hub 5 are integrated and surround the fixed shaft 2, being able to revolve around the fixed shaft 2. The thrust plate 6 in an annular shape allows the top end of the fixed shaft 2 to pass through its inside, and is fixed at the top of the sleeve 24 and opposed to the flange 3. In this hydrodynamic bearing, in particular, a gap is provided between the top end of the fixed shaft 2 and the thrust plate 6. The magnetic disks 10 are fixed on outer surfaces of the hub 5, being concentric with the fixed shaft 2. For example, several sheets of the magnetic disks 10 are installed. Here, the number of the magnetic disk 10 may be one. The spacers 11 are installed between inner radii of the magnetic disks 10, and the clamper 12 further presses down the inner radii of the magnetic disks 10 from the top. Thereby, the magnetic disks 10 are fixed on the hub 5. Magnets 8 are installed on inner surfaces of the hub 5. On the other hand, stators 9 are installed on the base 1 and opposed to the magnets 8. The bottom end of the support 16 is fixed on the base 1. The swing arms 15 comprise the heads 14 at their tips, and are connected at their rear ends to the support 16, being allowed to swing. One pair of the head 14 and the swing arm 15 is provided for one side each of the magnetic disks 10.

Figure 1:
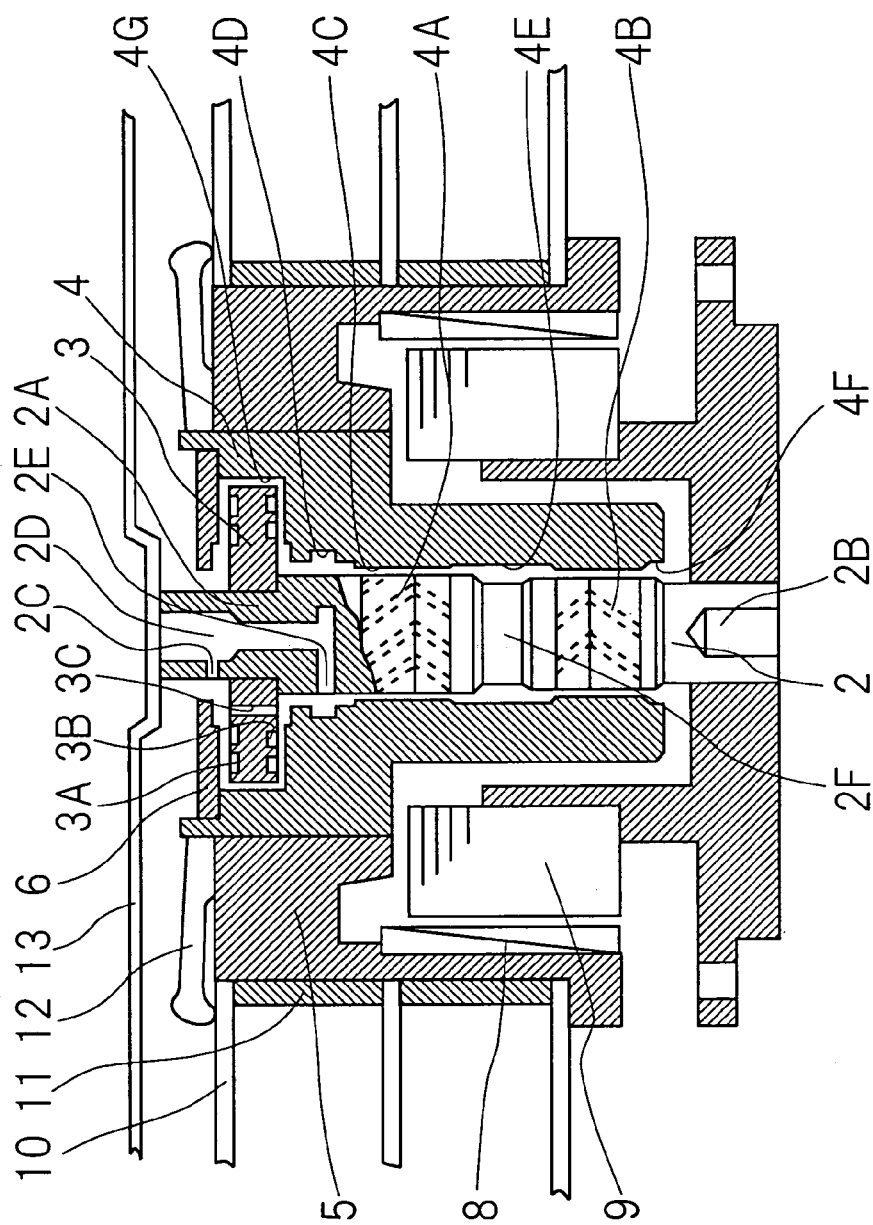
FIG. 1 is a cross-sectional view of a hydrodynamic bearing according to Embodiment 1 of the present invention.

FIG. 1 is a cross-sectional view of the above-described hydrodynamic bearing. FIG. 1 shows a cross section of the top of the fixed shaft 2 and sides of other parts. Radial dynamic pressure grooves are provided, for example, in two separated regions on the side of the center part of the fixed shaft 2 (see broken lines shown in FIG. 1.) Of those two regions, one region in the flange 3 side is referred to as a first region 4A, and the other region in the base 1 side is referred to as a second region 4B. Radial dynamic pressure grooves may be provided on an inner surface 4C of the sleeve 4 instead of or in addition to the side of the fixed shaft 2. The radial dynamic pressure grooves are, for example, herringbone-shaped grooves. Alternatively, radial dynamic pressure grooves may be shaped into spirals. A top end 2A and a bottom end (a mounting section) 2B of the fixed shaft 2 and an intermediate region 2F between the first region 4A and the second region 4B each are smaller in diameter than the first region 4A and the second region 4B. Thus, the diameters of the fixed shaft 2 changes in the axial direction, for example, within the range of 2–6 mm. A vent 2D is provided inside the top end 2A of the fixed shaft 2. The vent 2D is connected to a space over the flange 3 through its upper opening 2C, and connected to a space under the flange 3 through its lower opening 2E. Thereby, the spaces over and under the flange 3 are connected to each other, and further connected to outside space through a gap between the top end 2A of the fixed shaft 2 and the thrust plate 6. As a result, air pressures in the spaces are maintained to be substantially equal to outside air pressure. In particular, no substantial difference in pressure occurs between the spaces over and under the flange 3.

The flange 3 is placed inside a hollow 4G provided on an inner surface of the upper opening of the sleeve 4. Thrust dynamic pressure grooves 3A and 3B are provided on upper and lower surfaces of the flange 3, respectively. Alternatively, thrust dynamic pressure grooves may be provided only on one side of the flange 3. Thrust dynamic pressure grooves are, for example, herringbone-shaped grooves. Alternatively, thrust dynamic pressure grooves may be shaped into spirals. The thrust dynamic pressure grooves may be provided on one or both of a surface of the hollow 4G of the sleeve 4 and the lower surface of the thrust plate 6, instead of or in addition to the surface of the flange 3. A circulation hole 3C in the axial direction of the fixed shaft 2 is provided in an inner radius of the flange 3, and connects spaces over and under the flange 3 to each other. The circulation hole 3C is, for example, a circular hole 0.3–1.0 mm in diameter.

A plurality of hollows is provided on the inner surface 4C of the sleeve 4. Those hollows are, in order of vertical position, the above-described hollow 4G, a small hollow 4D immediately below it, a large-diameter region 4E opposed to the intermediate region 2F between the first region 4A and the second region 4B of the fixed shaft 2, and a step part 4F at the lower opening of the sleeve 4.

Figure 2:
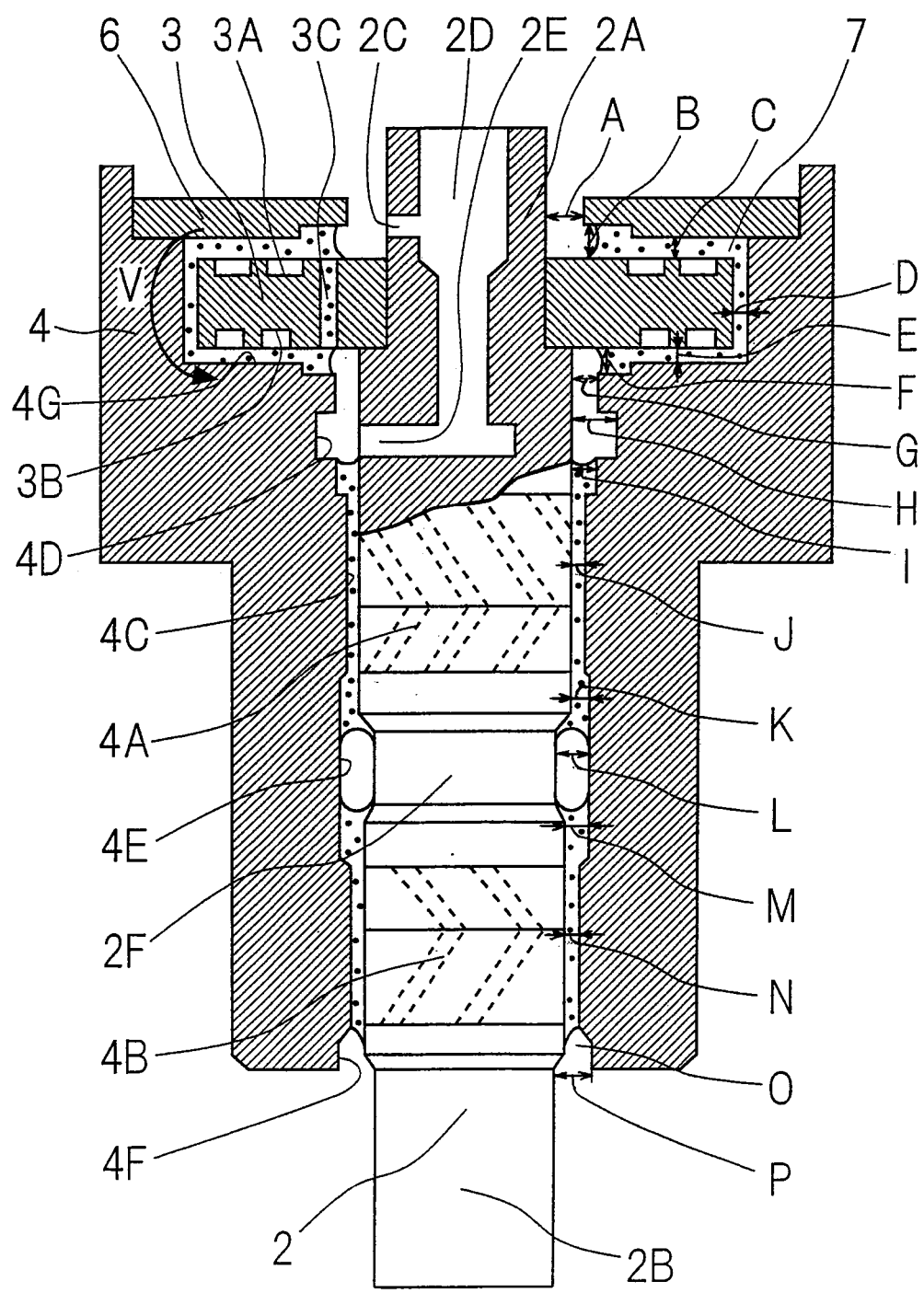
FIG. 2 is a cross-sectional view showing a fixed shaft 2 and its vicinity of the hydrodynamic bearing according to Embodiment 1 of the present invention.

FIG. 2 is a cross-sectional view showing the fixed shaft 2 and its vicinity of the above-described hydrodynamic bearing. FIG. 2 shows a cross section of the top of the fixed shaft 2 and sides of other parts, in a manner similar to that of FIG. 1. The circulation hole 3C of the flange 3 is preferably provided immediately inside the inner-radius sides of the thrust dynamic pressure grooves 3A and 3B, as shown in FIG. 2. More preferably, the circulation hole 3C is provided in a part of the thrust dynamic pressure grooves 3B on the lower surface of the flange 3.

With a lubricant 7, gaps between the fixed shaft 2 (or the flange 3) and the sleeve 4 (or the thrust plate 6) and the circulation hole 3C of the flange 3 are filled. In particular, the lubricant 7 covers the first region 4A, the second region 4B, and the thrust dynamic pressure grooves 3A and 3B. The lubricant 7 is preferably oil. Generally, the narrower gaps, the stronger sealing forces of the lubricant 7 with which the gaps are filled. As described above, the axial changes in diameter are provided for the fixed shaft 2, and a plurality of the hollows 4G, 4D, 4E, and 4F is provided on the inner surface 4C of the sleeve 4. Thereby, gaps between the fixed shaft 2 (or the flange 3) and the sleeve 4 (or the thrust plate 6) are narrow only in places to be maintained in a condition filled with the lubricant 7 (that is, the first region 4A, the second region 4B, the thrust dynamic pressure grooves 3A and 3B, and their vicinities.) Accordingly, the lubricant 7 hardly escape from those places. Thus, the lubricant 7 firmly covers the whole of the radial dynamic pressure grooves and the thrust dynamic pressure grooves 3A and 3B.

Figure 6:
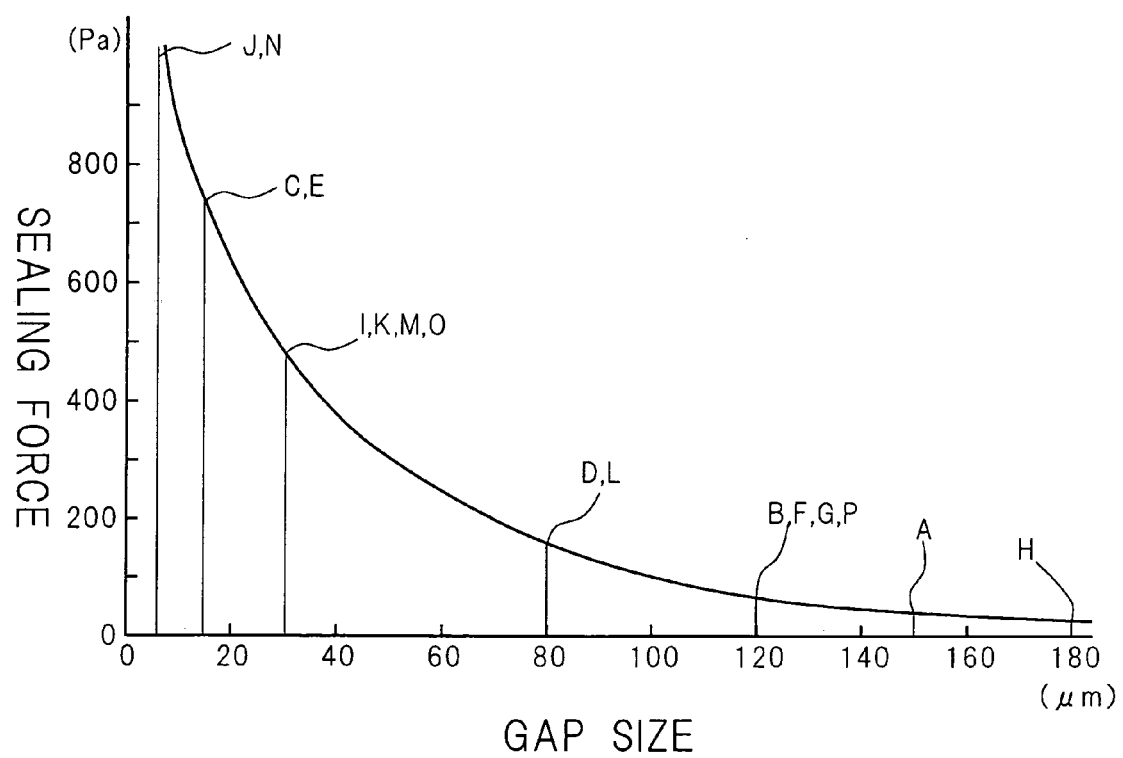
FIG. 6 is a graph showing a relation between gap sizes and sealing forces of lubricant for the hydrodynamic bearing according to Embodiment 1 of the present invention.

FIG. 6 is a graph showing a relation between gap sizes and sealing forces of the lubricant 7 for the hydrodynamic bearing according to Embodiment 1 of the present invention. In FIG. 6, the horizontal and vertical axes show gap sizes in micrometers (μm) and sealing forces in Pascals (Pa), respectively. FIG. 6, in particular, shows an example of correspondences between gap sizes and sealing forces of the lubricant 7 for the respective gaps A, B, C, . . . , and P shown in FIG. 2.

Gaps among the top end 2A of the fixed shaft 2, the flange 3, and the thrust plate 6 are set as follows (see FIG. 2.) Axial and radial directions hereafter refer to the axial and radial directions of the fixed shaft 2, respectively. Let A be a radial distance in the gap A between the fixed shaft 2 and the thrust plate 6, B be a distance in the axial direction of the fixed shaft in the gap B between the flange 3 and the inner radii of the thrust plate 6, and C be a distance of the axial direction of the fixed shaft in the gap C between the thrust dynamic pressure grooves 3A and the thrust plate 6. Then, inequalities A>B>C hold (here, the gaps and the distances are represented by the same reference symbols in order to clarify the correspondences between them.) In the settings, in an order of the gaps, C, B, A, the sealing forces of the lubricant 7 reduce the strengths (see FIG. 6.) Accordingly, the lubricant 7 hardly escape from the thrust dynamic pressure grooves 3A and their vicinity C toward the fixed shaft 2. In particular, the lubricant 7 hardly shift to the gap A between the fixed shaft 2 and the thrust plate 6 since the gap A is large. Thus, the lubricant 7 is prevented from escaping upward from the gap A.

Gaps among the flange 3, the hollow 4G of the sleeve 4, and the thrust plate 6 are set as follows (see FIG. 2.) Let B be an axial distance in the gap B between the inner radii of the thrust plate 6 and the flange 3, F be an axial distance in the gap F between the inner radii of the flange 3 and the hollow 4G of the sleeve 4, and D be a radial distance in the gap D between the perimeter of the flange 3 and the hollow 4G of the sleeve 4. Then, inequalities B>D and F>D hold (here, the gaps and the distances are represented by the same reference symbols in order to clarify the correspondences between them.) In the settings, the sealing force of the lubricant 7 in the gap D is stronger than those in the gaps B and F (see FIG. 6.) Accordingly, the lubricant 7 hardly escape from the thrust dynamic pressure grooves 3A and 3B and their vicinities C and E toward the fixed shaft 2. Thus, the lubricant 7 firmly covers the whole of the thrust dynamic pressure grooves 3A and 3B.

Under the flange 3, gaps among the fixed shaft 2, the flange 3, and the sleeves 4 are set as follows (see FIG. 2.) Let E be an axial distance in the gap E between the thrust dynamic pressure grooves 3B and their vicinity E, and hollow 4G of the sleeve 4, G be a radial distance in the gap G between the fixed shaft 2 and the inner surface of the sleeve 4 immediately below the hollow 4G of the sleeve 4, and H be a radial distance in the gap H between the fixed shaft 2 and the small hollow 4D of the sleeve 4. Then, inequalities H>G>E hold (here, the gaps and the distances are represented by the same reference symbols in order to clarify the correspondences between them.) In the settings, in an order of the gaps, E, G, H, the sealing forces of the lubricant 7 reduce the strengths (see FIG. 6.) Accordingly, the lubricant 7 hardly escape from the thrust dynamic pressure grooves 3B and their vicinity E toward the fixed shaft 2. In particular, the lubricant 7 hardly shift to the gap H between the fixed shaft 2 and the inner surface 4C of the sleeve 4 in the small hollow 4D of the sleeve 4, since the gap H is large. Thus, the lubricant 7 is prevented from escaping downward from the gap between the flange 3 and the hollow 4G of the sleeve 4. In addition, the lubricant 7 is prevented from escaping upward via the vent 2D.

In the first region 4A and regions over it, gaps between the fixed shaft 2 and the inner surface 4C of the sleeve 4 are set as follows (see FIG. 2.) Let H be a radial distance in the gap H between the fixed shaft 2 and the small hollow 4D of the sleeve 4, I be a radial distance in the gap I between the region adjacent to the upper side of the first region 4A and the inner surface 4C of the sleeve 4, and J be a radial distance in the gap J between the first region 4A and the inner surface 4C of the sleeve 4. Then, inequalities H>I>J hold (here, the gaps and the distances are represented by the same reference symbols in order to clarify the correspondences between them.) In the settings, in an order of the gaps, J, I, H, the sealing forces of the lubricant 7 reduce the strengths (see FIG. 6.) Accordingly, the lubricant 7 hardly escape upward from the first region 4A and its vicinity J. In particular, the lubricant 7 hardly shift to the gap H between the fixed shaft 2 and the inner surfaces 4C of the sleeve 4 in the small hollow 4D of the sleeve 4, since the gap H is large. Thus, the lubricant 7 is prevented from escaping upward from the first region 4A. In addition, the lubricant 7 is prevented from escaping upward via the vent 2D.

In the first region 4A and regions under it, gaps between the fixed shaft 2 and the inner surface 4C of the sleeve 4 are set as follows (see FIG. 2.) Let J be a radial distance in the gap J between the first region 4A and the inner surface 4C of the sleeve 4, K be a radial distance in the gap K between the region adjacent to the lower side of the first region 4A and the large-diameter region 4E of the sleeve 4, and L be a radial distance in the gap L between the intermediate region 2F between the first region 4A and the second region 4B and the large-diameter region 4E of the sleeve 4. Then, inequalities L>K>J hold (here, the gaps and the distances are represented by the same reference symbols in order to clarify the correspondences between them.) In the settings, in an order of the gaps, J, K, L, the sealing forces of the lubricant 7 reduce the strengths (see FIG. 6.) Accordingly, the lubricant 7 hardly escape downward from the first region 4A and its vicinity J. In particular, the lubricant 7 hardly shift to the gap L between the fixed shaft 2 and the inner surface 4C of the sleeve 4 in the intermediate region 2F, since the gap L is large. Thus, the lubricant 7 is prevented from escaping downward from the first region 4A.

In the first region 4A and adjacent regions over and under it, gaps between the fixed shaft 2 and the inner surface 4C of the sleeve 4 are set as follows (see FIG. 2.) Let H be a radial distance in the gap H between the fixed shaft 2 and the small hollow 4D of the sleeve 4, J be a radial distance in the gap J between the first region 4A and the inner surface 4C of the sleeve 4, and K be a radial distance in the gap K between the region adjacent to the lower side of the first region 4A and the large-diameter region 4E of the sleeve 4. Then, inequalities H>K>J hold (here, the gaps and the distances are represented by the same reference symbols in order to clarify the correspondences between them.) In the settings, in an order of the gaps, J, K, H, the sealing forces of the lubricant 7 reduce the strengths (see FIG. 6.) Accordingly, it is more unlikely that the lubricant 7 escapes upward, than downward, from the first region 4A and its vicinity J. Thus, the lubricant 7 is further prevented from escaping upward from the first region 4A. In particular, the lubricant 7 is prevented from escaping upward via the vent 2D.

In the second region 4B and regions over it, gaps between the fixed shaft 2 and the inner surface 4C of the sleeve 4 are set as follows (see FIG. 2.) Let L be a radial distance in the gap L between the intermediate region 2F between the first region 4A and the second region 4B and the large-diameter region 4E of the sleeve 4, M be a radial distance in the gap M between the region adjacent to the upper side of the second region 4B and the large-diameter region 4E of the sleeve 4, and N be a radial distance in the gap N between the second region 4B and the inner surface 4C of the sleeve 4. Then, inequalities L>M>N hold (here, the gaps and the distances are represented by the same reference symbols in order to clarify the correspondences between them.) In the settings, in an order of the gaps, N, M, L, the sealing forces of the lubricant 7 reduce the strengths (see FIG. 6.) Accordingly, the lubricant 7 hardly escape upward from the second region 4B and its vicinity N. In particular, the lubricant 7 hardly shift to the gap L between the fixed shaft 2 and the inner surface 4C of the sleeve 4 in the intermediate region 2F, since the gap L is large. Thus, the lubricant 7 is prevented from escaping upward from the second region 4B.

In the second region 4B and regions under it, gaps between the fixed shaft 2 and the inner surface 4C of the sleeve 4 are set as follows (see FIG. 2.) Let N be a radial distance in the gap N between the second region 4B and the inner surface 4C of the sleeve 4, O be a radial distance in the gap O between the region adjacent to the lower side of the second region 4B and the step part 4F of the sleeve 4, and P be a radial distance in the gap P between the bottom end 2B of the fixed shaft 2 and the step part 4F of the sleeve 4.

Then, inequalities P>O>N hold (here, the gaps and the distances are represented by the same reference symbols in order to clarify the correspondences between them.) In the settings, in an order of the gaps, N, O, P, the sealing forces of the lubricant 7 reduce the strengths (see FIG. 6.) Accordingly, the lubricant 7 hardly escape downward from the second region 4B and its vicinity N. In particular, the lubricant 7 hardly shift to the gap P between the bottom end 2B of the fixed shaft 2 and the inner surface 4C of the sleeve 4 in the step part 4F of the sleeve 4, since the gap P is large. Thus, the lubricant 7 is prevented from escaping downward from the gap P.

In the second region 4B and adjacent regions over and under it, gaps between the fixed shaft 2 and the inner surface 4C of the sleeve 4 are set as follows (see FIG. 2.) Let L be a radial distance in the gap L between the intermediate region 2F between the first region 4A and the second region 4B and the large-diameter region 4E of the sleeve 4, M be a radial distance in the gap M between the region adjacent to the upper side of the second region 4B and the large-diameter region 4E of the sleeve 4, N be a radial distance in the gap N between the second region 4B and the inner surface 4C of the sleeve 4, and P be a radial distance in the gap P between the bottom end 2B of the fixed shaft 2 and the step part 4F of the sleeve 4. Then, inequalities P>L>M>N hold (here, the gaps and the distances are represented by the same reference symbols in order to clarify the correspondences between them.) In the settings, in an order of the gaps, N, M, L, P, the sealing forces of the lubricant 7 reduce the strengths (see FIG. 6.) Accordingly, it is more unlikely that the lubricant 7 escapes downward, than upward, from the second region 4B and its vicinity N. Thus, the lubricant 7 is further prevented from escaping downward from the second region 4B. In particular, the lubricant 7 is prevented from escaping downward from the vicinity P of the step part 4F of the sleeve 4.

FIG. 6 is only one example out of many, showing the correspondences between the sizes of the gaps A–P and the sealing forces of the lubricant 7 shown in FIG. 2. In order to cause the sealing forces of the lubricant 7 to maintain the lubricant 7 in the first region 4A, the second region 4B, and the thrust dynamic pressure grooves 3A and 3B and their vicinities, as described above, the gaps A–P may be set in the following manner. Radial distances may be set in the 1–10 µm range in the gap J in the first region 4A and its vicinity and the gap N in the second region 4B and its vicinity. Axial distances may be set in the 5–60 µm range in the gaps C and E in the thrust dynamic pressure grooves 3A and 3B and their vicinities. Radial distances may beset in the 10–80 µm range in the gaps I and K in the adjacent regions of the first region 4A, and the gaps M and O in the adjacent regions of the second region 4B. A radial distance may be set in the 20–200 µm range in the gap D between the perimeter of the flange 3 and the hollow 4G of the sleeve 4. A radial distance may be set in the 20–200 µm range in the gap L in the intermediate region 2F between the first region 4A and the second region 4B and its vicinity. Axial distances may be set in the 50–300 µm range in the gap B under the inner radii of the thrust plate 6 and the gap F under the inner radii of the flange 3. Radial distances may be set in the 50–300 µm range in the gap G under the inner radii of the flange 3 and the gap P between the step part 4F of the sleeve 4 and the fixed shaft 2. A radial distance may be set in the 50–800 µm range in the gap A between the top end 2A of the fixed shaft 2 and the thrust plate 6. A radial distance may be set in the 50–800 µm range in the gap H between the fixed shaft 2 and the small hollow 4D of the sleeve 4.

When the above-described disk recording/reproducing apparatus performs recording/reproducing of data for the magnetic disks 10, the above-described hydrodynamic bearing operates as follows. Rotating magnetic fields occur when the stators 9 are energized. The hub 5 undergoes a torque from the rotating magnetic fields through the magnets 8. Thereby, the sleeve 4, the hub 5, the thrust plate 6, and the magnetic disks 10 in a body revolve around the fixed shaft 2. During the revolution, the lubricant 7 flows along the radial dynamic pressure grooves in the first region 4A and the second region 4B and their vicinities, and is concentrated in the central parts of the respective regions. As a result, pressure in the radial direction of the fixed shaft 2 rises in those central parts. This pumping effect maintains stable spacing between the fixed shaft 2 and the sleeve 4, and thereby, the axis of revolution of the magnetic disks 10 does not substantially shift in the radial direction of the fixed shaft 2. Similarly, the lubricant 7 flows along the thrust dynamic pressure grooves 3A and 3B on the surfaces of the flange 3, and is concentrated on the middle parts of the respective surfaces of the flange 3. As a result, pressure in the axial direction of the fixed shaft 2 rises on the surfaces of the flange 3. This pumping effect maintains stable spacing between the flange 3 and the hollow 4G of the sleeve 4, and stable spacing between the flange 3 and the thrust plate 6. Therefore, the axis of revolution of the magnetic disks 10 does not substantially tilt from the axial direction of the fixed shaft 2. Thus, the above-described hydrodynamic bearing maintains the high-speed revolution of the magnetic disks 10 stable with high precision.

At the high-speed revolution of the magnetic disks 10, the above-described hydrodynamic bearing maintains the radial dynamic pressure grooves in the condition filled with the lubricant 7 as follows, thereby maintaining the pumping effects sufficient. When the sleeve 4 revolves, the lubricant 7 undergoes centrifugal force since the lubricant 7 revolves around the fixed shaft 2 together with the sleeve 4. The diameters of the fixed shaft 2, as shown in FIG. 2, reduce from the first region 4A toward the intermediate region 2F, increase from the intermediate region 2F toward the second region 4B, and reduce again from the second region 4B toward the bottom end 2B. Because of this shape of the side of the fixed shaft 2, centrifugal force acting in the lubricant 7 maintains the lubricant 7 within the first region 4A and the second region 4B. In the lower opening of the sleeve 4, centrifugal force further maintains the lubricant 7 away from the lower opening, thus preventing the lubricant 7 from escaping downward.

At the high-speed revolution of the magnetic disks 10, the above-described hydrodynamic bearing maintains the thrust dynamic pressure grooves 3A and 3B in the condition filled with the lubricant 7 as follows, thereby maintaining the pumping effects sufficient. First, on the surfaces of the flange 3, centrifugal force acting in the lubricant 7 pushes the lubricant 7 toward the outer radii of the flange 3. The lubricant 7 is maintained in the thrust dynamic pressure grooves 3A and 3B and their vicinities, because of centrifugal force and the flows along the thrust dynamic pressure grooves. In particular, centrifugal force maintains the lubricant 7 away from the gap A between the fixed shaft 2 and the thrust plate 6 and the lower opening 2E of the vent 2D, thus preventing the lubricant 7 from escaping upward. Next, the pumping effects due to the thrust dynamic pressure grooves actually lack in balance over and under the flange 3 because of, for example, shocks/vibrations from the outside and fabrication inaccuracies. Accordingly, at the revolution of the sleeve 4, the lubricant 7, passing through the circulation hole 3C (see FIG. 2), circulates on the surfaces of the flange 3 in a direction of the arrow V shown in FIG. 2 or the reverse direction. The circulation reliably maintains the lubricant 7 covering the whole of the thrust dynamic pressure grooves 3A and 3B, even when shocks/vibrations act from the outside, for example. Furthermore, no excessive difference in pressure occurs between spaces over and under the flange 3 because of the vent 2D. Thereby, the swelling pressure of air bubbles intruding into the lubricant 7 hardly become excessively high even at variations in outside air pressure or temperature rises of the lubricant 7. Therefore, the lubricant 7 reliably keeps covering the whole of the thrust dynamic pressure grooves 3A and 3B, regardless of variations of ambient condition.

At the high-speed revolution of the magnetic disks 10, the swing arms 15 swing around the support 16, and move the heads 14 to destinations over the magnetic disks 10. Here, the head 14 floats at a minute distance from the surface of the magnetic disk 10 because of the high-speed revolution of the magnetic disk 10. At the destinations over the magnetic disks 10, the heads 14 write data onto the magnetic disks 10, or read data from the magnetic disks 10. Here, the above-described hydrodynamic bearing maintains the high-speed revolution of the magnetic disks 10 stable with high precision, and therefore the reading and writing of data by the heads 14 have high reliability.

EMBODIMENT 2

A hydrodynamic bearing according to Embodiment 2 of the present invention is different only in construction of vent from the hydrodynamic bearing according to the Embodiment 1 of the present invention. For constructions and operations of the hydrodynamic bearing according to Embodiment 2 of the present invention that are similar to those of the hydrodynamic bearing according to Embodiment 1 of the present invention, descriptions in Embodiment 1 are cited.

Figure 3:
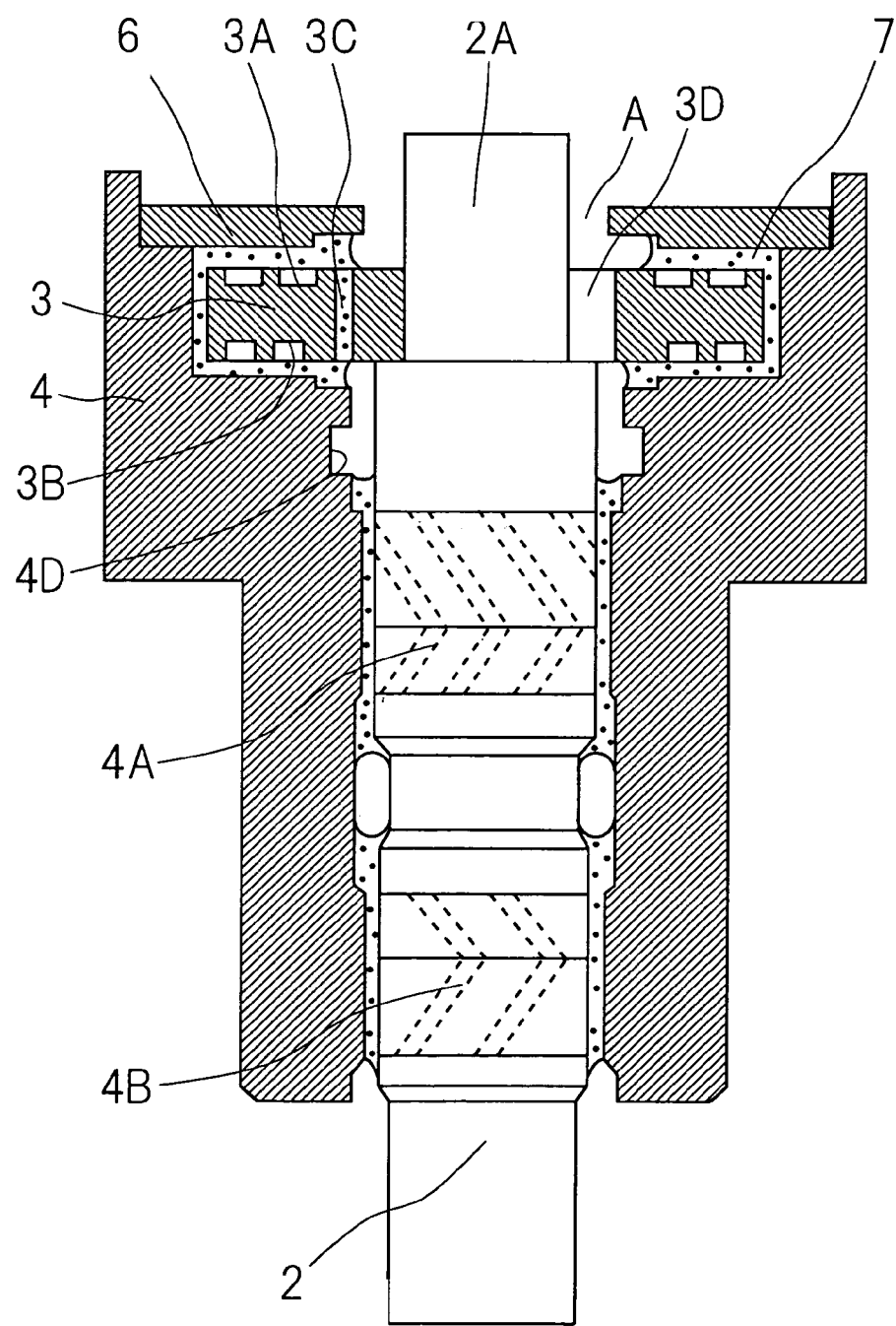
FIG. 3 is a cross-sectional view showing a fixed shaft 2 and its vicinity of the hydrodynamic bearing according to Embodiment 2 of the present invention.

FIG. 3 is a cross-sectional view showing a fixed shaft 2 and its vicinity of the hydrodynamic bearing according to Embodiment 2 of the present invention. In FIG. 3, components similar to components shown in FIG. 2 are marked with the same reference symbols as the reference symbols shown in FIG. 2. A vertical groove 3D is provided on an inside surface of the flange 3 in this hydrodynamic bearing. In the joint between the fixed shaft 2 and the flange 3, the vertical groove 3D functions as a vent similar to the vent 2D (see FIG. 2) according to Embodiment 1 of the present invention. In other words, the vertical groove 3D connects spaces over and under the flange 3 to each other. Thereby, the space under the flange 3 is connected to the outside space through the gap between the top end 2A of the fixed shaft 2 and the thrust plate 6. Thereby, air pressures in the spaces are maintained to be substantially equal to outside air pressure. In particular, no substantial difference in pressure occurs between the spaces over and under the flange 3. Accordingly, the swelling pressure of air bubbles intruding into the lubricant 7 hardly becomes excessively high even at variations in air pressure or temperature rises of the lubricant 7. Therefore, the lubricant 7 reliably keeps covering the whole of the thrust dynamic pressure grooves 3A and 3B, regardless of variations in ambient condition.

Figure 4:
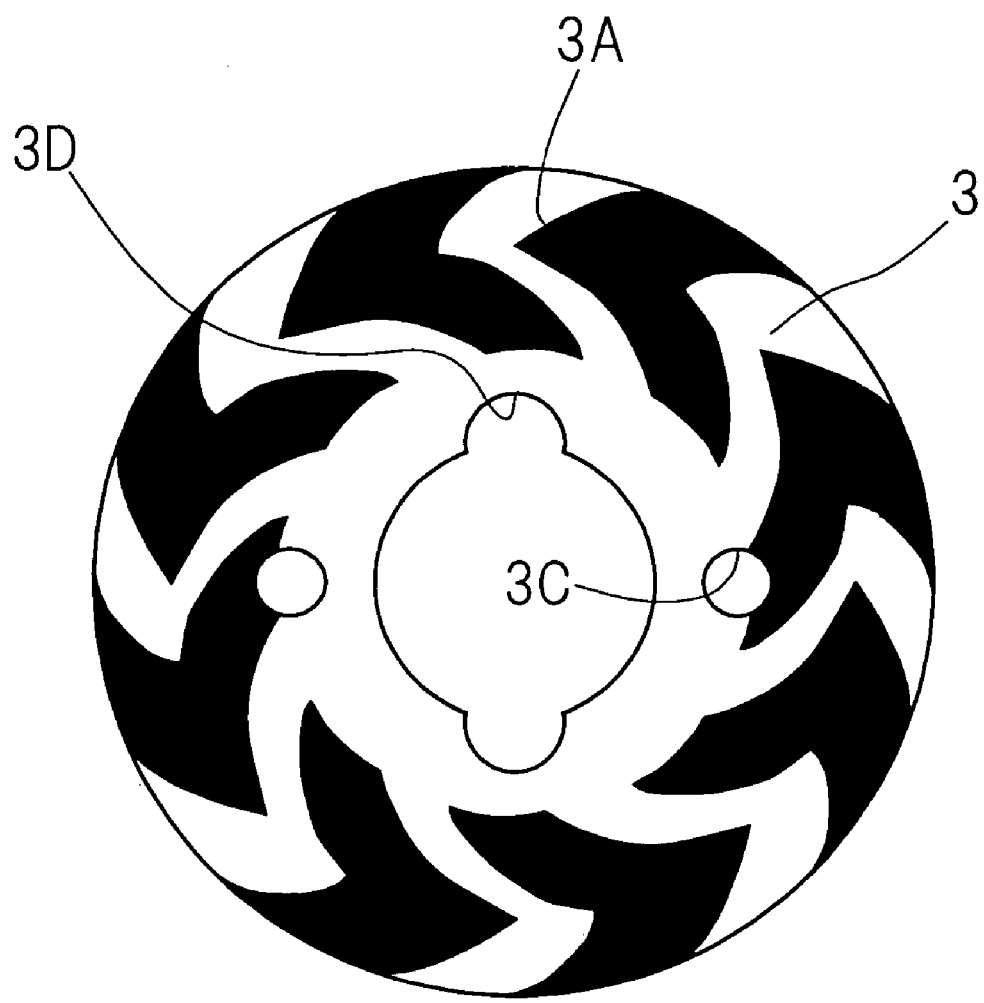
FIG. 4 is a top view of a flange 3 of the hydrodynamic bearing according to Embodiment 2 of the present invention.

FIG. 4 is a top view of the flange 3 according to Embodiment 2 of the present invention. The flange 3 is an annular shape as shown in FIG. 4. For the flange 3, a circulation hole 3C being a through hole and a vertical groove 3D on the inside are provided. These shapes are, for example, formed at a time by stampings. Accordingly, the outside shape of the flange 3 is manufactured with ease and at low cost. In that case, no vent may be further required to be provided in the fixed shaft 2 in contrast to Embodiment 1 of the present invention, and thus, the fixed shaft 2 is manufactured with ease and at low cost. Here, a vertical groove may be provided on a side of the fixed shaft 2, instead of the vertical groove 3D of the flange 3. In the joint between the fixed shaft 2 and the flange 3, the vertical groove functions as a vent, in a manner similar to that of the above-described vertical groove 3D of the flange 3.

EMBODIMENT 3

A hydrodynamic bearing according to Embodiment 3 of the present invention is different only in construction of circulation hole from the hydrodynamic bearing according to the Embodiment 1 of the present invention. For constructions and operations of the hydrodynamic bearing according to Embodiment 3 of the present invention that are similar to those of the hydrodynamic bearing according to Embodiment 1 of the present invention, descriptions in Embodiment 1 are cited.

Figure 5:
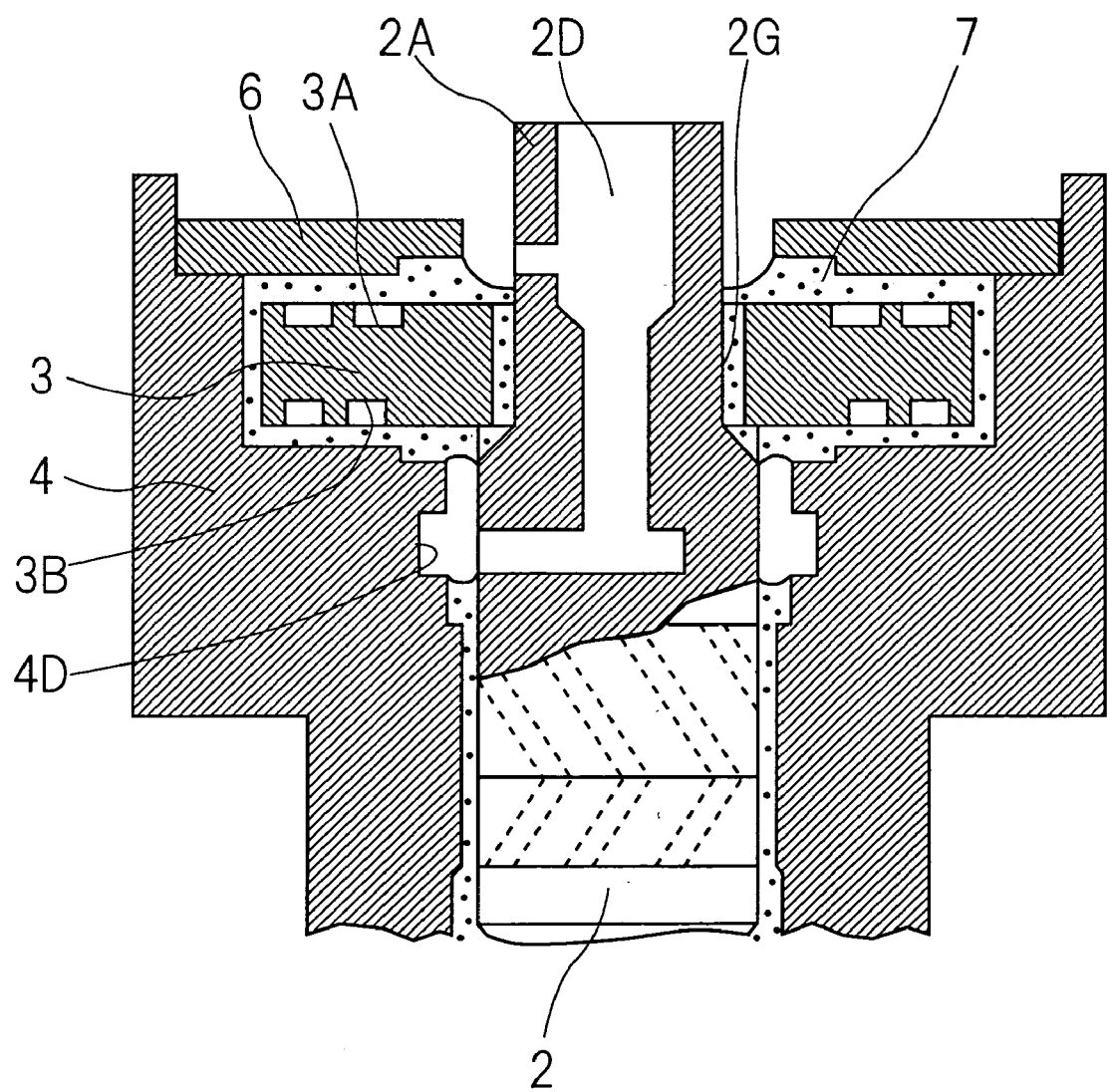
FIG. 5 is a cross-sectional view showing a top end 2A and its vicinity of a fixed shaft 2 of a hydrodynamic bearing according to Embodiment 3 of the present invention.

FIG. 5 is a cross-sectional view showing the top end 2A of the fixed shaft 2 and its vicinity of the hydrodynamic bearing according to Embodiment 3 of the present invention. FIG. 5 shows the cross section of the top end 2A of the fixed shaft 2 and sides of other parts. Further in FIG. 5, components similar to components shown in FIG. 2 are marked with the same reference symbols as the reference symbols shown in FIG. 2. A vertical groove 2G is provided on a side of the fixed shaft 2 in this hydrodynamic bearing. In the joint between the fixed shaft 2 and the flange 3, the vertical groove 2G functions as a circulation hole similar to the circulation hole 3C (see FIG. 2) according to Embodiment 1 of the present invention. In other words, at the revolution of the sleeve 4, the lubricant 7 circulates on the surfaces of the flange 3 through the circulation hole 2G, because of differences in the pumping effects over and under the flange 3. The circulation causes the lubricant 7 to reliably keep covering the whole of the thrust dynamic pressure grooves 3A and 3B, even when, for example, shocks/vibrations act from the outside. Here, a vertical groove may be provided on a side of the flange 3, instead of the vertical groove 2G of the fixed shaft 2. In the joint between the fixed shaft 2 and the flange 3, the vertical groove functions as a circulation hole in a manner similar to that of the above-described vertical groove 2G of the fixed shaft 2.

The hydrodynamic bearing according to the present invention maintains the high-speed revolution of the sleeve stable with high precision, and prevents the lubricant from escaping, as described above, thereby having high reliability. Disk recording/reproducing apparatuses equipped with these hydrodynamic bearings can easily realize further increases in capacity and further speedups of data transfer, and maintain high reliability for a long time. Accordingly, the installation of the hydrodynamic bearings on disk recording/reproducing apparatuses has very high utility in industry.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

The invention claimed is:

1. A hydrodynamic bearing comprising:
   (a) a cabinet including a base and a cover;
   (b) a fixed shaft including a first end having a mounting part fixed on one of said base and said cover, and a second end at the opposite side of said fixed shaft;
   (c) a flange in an annular shape, with said second end of said fixed shaft inserted into its inside, and fixed on said second end of said fixed shaft, thereby being substantially perpendicular to the axial direction of said fixed shaft;
   (d) a sleeve, when said fixed shaft is inserted into its inside, allowed to revolve around said fixed shaft and placed where a hollow provided on an inner surface of said sleeve is in the vicinity of a surface of said flange;
   (e) a thrust plate in an annular shape and fixed on one of opening ends of said sleeve, thereby being placed close to said flange when said second end of said fixed shaft is inserted inside said thrust plate; and
   (f) a lubricant with which the whole of radial dynamic pressure grooves provided at least one of a side of said fixed shaft and an inner surface of said sleeve, and the whole of thrust dynamic pressure grooves provided at least one of a surface of said flange, a surface of said hollow of said sleeve, and a surface of said thrust plate, are filled and covered;
   wherein:
   (g) a circulation hole connecting spaces over and under said flange to each other is provided, and said lubricant circulates on surfaces of said flange through said circulation hole; and
   (h) a vent connecting spaces around a joint between said fixed shaft and said flange to each other is provided inside said fixed shaft.

2. A hydrodynamic bearing according to claim 1 wherein said circulation hole is provided in said flange.

3. A hydrodynamic bearing according to claim 1, wherein an inequality L<P holds when said radial dynamic pressure grooves are provided in two separated regions, a first region near said flange and a second region near said mounting part of said fixed shaft, where L is a distance in the radial direction of said fixed shaft between said fixed shaft and said sleeve in an intermediate region between said first region and said second region, and P is said distance at an opening of said sleeve near said mounting part of said fixed shaft.

4. A hydrodynamic bearing according to claim 1, wherein said circulation hole is a vertical groove provided on at least one of a side of said fixed shaft and a side of said flange.

5. A hydrodynamic bearing according to claim 1, wherein inequalities A>B>C hold, where A is a distance in the radial direction of said fixed shaft between said fixed shaft and said thrust plate, B is a distance in the axial direction of said fixed shaft between an inner radius of said thrust plate and said flange, and C is a distance in the axial direction of said fixed shaft between said thrust plate and said flange over said thrust dynamic pressure grooves and their vicinity.

6. A hydrodynamic bearing according to claim 1, wherein inequalities B>D and F>D hold, where B is a distance in the axial direction of said fixed shaft between an inner radius of said thrust plate and said flange, F is a distance in the axial direction of said fixed shaft between an inner radius of said flange and said hollow of said sleeve, and D is a distance in the radial direction of said fixed shaft between said flange and said hollows of said sleeve.

7. A hydrodynamic bearing according to claim 1, wherein inequalities N<M<P hold when said radial dynamic pressure grooves are provided in two separated regions, a first region near said flange and a second region near said mounting part of said fixed shaft, where N is a distance in the radial direction of said fixed shaft between said fixed shaft and said sleeve in said second region, M is said distance in a region adjacent to a side of said second region near said flange, and P is said distance at an opening of said sleeve near said mounting part of said fixed shaft.

8. A hydrodynamic bearing according to claim 1, wherein inequalities J<K<L and N<M<L hold when said radial dynamic pressure grooves are provided in two separated regions, a first region near said flange and a second region near said mounting part of said fixed shaft, where J is a distance in the radial direction of said fixed shaft between said fixed shaft and said sleeve in said first region, K is said distance in a region adjacent to a side of said first region near said second region, L is said distance in an intermediate region between said first region and said second region, M is said distance in a region adjacent to a side of said second region near said first region, and N is said distance in said second region.

9. A disk recording/reproducing apparatus comprising:
   (a) a cabinet including a base and a cover;
   (b) a hydrodynamic bearing comprising:
      (i) a fixed shaft including a first end having a mounting part fixed on one of said base and said cover, and a second end at the opposite side of said fixed shaft;
      (ii) a flange in an annular shape, with said second end of said fixed shaft inserted into its inside, and fixed on said second end of said fixed shaft, thereby being substantially perpendicular to the axial direction of said fixed shaft;
      (iii) a sleeve, when said fixed shaft is inserted into its inside, allowed to revolve around said fixed shaft and placed where a hollow provided on an inner surface of said sleeve is in the vicinity of a surface of said flange;
      (iv) a thrust plate in an annular shape and fixed on one of opening ends of said sleeve, thereby being placed close to said flange when said second end of said fixed shaft is inserted inside said thrust plate; and
      (v) a lubricant with which the whole of radial dynamic pressure grooves provided at least one of a side of said fixed shaft and an inner surface of said sleeve, and the whole of thrust dynamic pressure grooves provided at least one of a surface of said flange, and a surface of said hollow of said sleeve, and a surface of said thrust plate, are filled and covered;
      wherein:
      (vi) a circulation hole connecting spaces over and under said flange to each other is provided, and said lubricant circulates on surfaces of said flange through said circulation hole; and
      (vii) a vent connecting spaces around a joint between said fixed shaft and said flange to each other is provided inside said fixed shaft;
   (c) a hub concentrically integrated with said sleeve;
   (d) a motor installed between said cabinet and said hub, including a magnet and a coil, and for exerting to said hub a torque for a revolution around said fixed shaft;
   (e) a magnetic disk concentrically fixed on said hub; and
   (f) a head, when said magnetic disk revolves because of said torque, being placed close to a surface of said magnetic disk, recording a signal onto said magnetic disk, and reproducing a signal from said magnetic disk.

* * * * *